US012690528B2

(12) United States Patent
    Boutte

(10) Patent No.: US 12,690,528 B2
(45) Date of Patent: Jul. 28, 2026

(54) LIMB CUTTING APPARATUS AND METHODS

(71) Applicant: Tierson Boutte, Atlanta, GA (US)

(72) Inventor: Tierson Boutte, Atlanta, GA (US)

( * ) Notice: Subject to any disclaimer, the term of this patent is extended or adjusted under 35 U.S.C. 154(b) by 456 days.

(21) Appl. No.: 18/084,279

(22) Filed: Dec. 19, 2022

(65) Prior Publication Data

US 2023/0189729 A1        Jun. 22, 2023

Related U.S. Application Data

(60) Provisional application No. 63/291,827, filed on Dec. 20, 2021.

(51) Int. Cl.
    *A01G 23/095*        (2006.01)
(52) U.S. Cl.
    CPC .................................. *A01G 23/0955* (2013.01)
(58) Field of Classification Search
    CPC .......... A01G 23/09; A01G 3/002; A01G 3/08;
                A01G 3/085; A01G 3/086; A01G 3/088
    See application file for complete search history.

(56) References Cited

U.S. PATENT DOCUMENTS

| | | | |
|---|---|---|---|
| 2,642,901 A | 6/1953 | Hayden | |
| 3,610,301 A | 10/1971 | Jordan | |
| 4,121,777 A * | 10/1978 | Kolstad | A01G 23/093 |
| | | | 144/34.1 |

| | | | |
|---|---|---|---|
| 5,390,715 A | 2/1995 | Lucsombe | |
| 6,311,746 B1 | 11/2001 | Halvorson | |
| 10,144,145 B1 | 12/2018 | Capers | |
| 2015/0082762 A1 | 3/2015 | Silcock et al. | |
| 2016/0029576 A1 * | 2/2016 | Peng | A01G 3/08 |
| | | | 241/101.3 |
| 2021/0237096 A1 * | 8/2021 | Ragnarsson | B02C 18/14 |

FOREIGN PATENT DOCUMENTS

| | | | |
|---|---|---|---|
| CA | 2665103 A1 | 11/2009 | |
| DE | 202005012082 U1 | 8/2005 | |

OTHER PUBLICATIONS

16" Clip-N-Tripm Hedge Trimming Attachment—G116B www.granberg.com/product/g116b-clip-n-trim-16/, accessed Oct. 11, 2022.
Cox, William C. IV and Mowbray, Rick, "Aerial Saw Is Boon to Line Trimming", May 16, 2017 at www.tdworld.com/vegetation-management/article/20969658 accessed Oct. 26, 2022.
Supplementary European Search Report for EP 22912356 dated Oct. 27, 2025.

* cited by examiner

*Primary Examiner* — Matthew Katcoff
(74) *Attorney, Agent, or Firm* — HILL, KERTSCHER & WHARTON, LLP; Gregory T. Ourada

(57) ABSTRACT

The embodiments described herein are directed to a cutting apparatus incorporating anti-pinching and anti-snag structures called anvils in conjunction with cutting means such as a cutting chain or series of circular saw blades. In one embodiment, the cutting apparatus may be incorporated into a cutting head connected to a vehicle by an articulated boom for use as part of an overall limb-cutting apparatus for use in utility or public easements that can prune hundreds of limbs quickly in a single plane, and then process the tree limbs efficiently.

11 Claims, 16 Drawing Sheets

LIMB CUTTING APPARATUS AND METHODS

FIELD OF THE INVENTION

The exemplary embodiments described herein are directed to limb cutting apparatus and certain methods for using these embodiments. These embodiments are envisioned primarily for use in large-scale commercial maintenance of public and utility easements in which wooded growth exists, particularly wooded growth near power lines and near roads.

BACKGROUND

The pruning of trees in the proximity of conductors or high-speed traffic remains a labor-intensive endeavor, with little innovation in the art since the introduction of insulated aerial lifts, or "bucket trucks". Tree trimmers typically utilize bucket trucks to position themselves above, at, or below electrical conductors, and then cut tree branches that encroach within a prescribed distance from the conductors. The tree branches are typically allowed to fall to the ground and are then manually collected and fed into wood chippers. In large part this is due to an absence of reliable mechanisms for efficiently accomplishing high-quality, large-scale linear cuts of tree limbs in public or utility easements. Current solutions include hedge trimmers, chainsaws, and circular saws, but none can effectively accomplish this. Hedge trimmers are limited to ¾" diameter branches because they operate by shearing the wood, and higher-energy designs would only allow a modest increase in maximum capacity. Furthermore, hedge trimmers tend to get caught in the material they are cutting. One solution to this is a modified chainsaw fitted with a series of finger-link protrusions attached to a spine that is bolted to the chain bar. This device is marketed by Granberg International as the "Clip n Trim" hedge-clipper. This device features a maximum cut of 1" to 2", since any larger material could not pass through the kerf without hitting the spine to which the finger-like protrusions are attached—meaning that, even if the finger spacing were increased, material cannot be completely cut unless its diameter is less than the distance from the cutting chain to the spine. Other chainsaw-like designs would only tear at branches and thereby result in an unacceptable level of quality. Circular-saw based pruning offers some of speed of the disclosed linear cutting mechanism but lacks control and has a poor cut quality. Furthermore, it is very difficult to offer repeated pruning along previous cut boundaries.

While the solutions described above a vast improvement over individually climbing trees to prune them, is nonetheless labor-intensive and the workers' constant proximity to energized conductors remains a hazard even though modern aerial lifts are insulated. Workers are regularly electrocuted and killed when directly or indirectly becoming involved in phase-to-phase or phase-to-ground shorts. Trees are typically pruned away from conductors on a cycle of 2-4 years. Trees north of the Tropic of Capricorn normally grow 2-4 feet per year, and utility companies desire that tree foliage does not encroach within 3-5 feet of their lines. A utility company may therefore specify that a contracted tree trimming company prune all branches 10-15 feet away from conductors in order that at the end of the pruning cycle the re-growth of foliage remains acceptably far from the conductors.

The repeated cutting of trees around conductors diverts trees to grow at least 10 feet from the lines in most cases. In the case of electrical conductors located next to a road, three (3) limb cutting planes can be defined parallel to the conductors and are illustrated in FIG. 1; namely, 1. A side cut plane 1, i.e., the plane orthogonal to both the ground and the "bottom cut plane," and typically located on the side of the conductors opposite the road, in which branches are "side pruned" to prevent them from laterally extending towards the conductors; and,
2. A top cut plane 2, i.e., the plane parallel to the ground and above the conductors. In this plane the tree typically has little incentive to grow towards the power line, owing to trees' propensity to grow towards light. Here, tree limbs may extend laterally over the lines and over time their weight may lead to limb failure or stem failure; and,
3. A bottom cut plane 3, i.e., the plane parallel to the ground and below the conductors 30 in which trees are "topped" to prevent their reaching the conductors.

In planes normal to the conductors 30, numerous obstacles are present: the poles that support the lines, the secondaries and the communication lines that cross the road, and the secondaries and communication lines that service customers are all found in these planes. These obstacles repeat, often multiple times in a single span. It is not always feasible to operate a linear trimming machine whose cutting path is parallel to the conductors.

The industry would therefore welcome systems and equipment which are adapted to efficiently prune trees along utility easements, collect the trimmings, and avoid intensive worker proximity to energized conductors. To accomplish this, a mechanism which cuts tree branches neatly, cleanly, and efficiently within an even plane of movement is desired. Such a mechanism shall herein be referred to as a "linear cutting mechanism." While the current state of the art includes many such devices, the industry would welcome a linear cutting mechanism that would work efficiently on limbs up to 6" in diameter, that would resist fouling and binding, and that would produce precision, high-quality cuts.

The industry would especially welcome a device which could navigate the obstacles commonly present in the power distribution environment while pruning trees using a linear cutting mechanism mounted to a cutting head for processing and disposing of the resultant debris inherent to any tree pruning operation.

SUMMARY

What is disclosed herein is a cutting apparatus which overcomes the aforementioned problems, and which includes features and embodiments to make it efficient for both the pruning and debris processing cycles of the work. The disclosure includes cutting head embodiments that feature a linear cutting mechanism in different arrangements with the processing equipment. Further, the disclosure includes additional embodiments for multiple degree-of-freedom articulated and insulated boom systems, and lastly for stable vehicles which support said boom system, cutting head, and linear cutting mechanism. The cutting head may further incorporate anti-snagging and anti-pinching structures and may be capable of efficiently collecting and chipping trimmed limbs.

DETAILED DESCRIPTION OF THE INVENTION

The invention is described in preferred embodiments in the following description with references to the Figures, in which like numbers represent the same or similar elements. References throughout this specification to "one embodiment," or "an embodiment," or similar language means that particular feature, structure, or characteristic described in connection with the embodiment is included in at least one embodiment of the present invention. Thus, appearances of the phrases "in one embodiment," in an embodiment," "in a potential embodiment," "in certain embodiments," or similar language throughout this specification may, but do not necessarily, all refer to the same embodiment. It is noted that, as used in this description, the singular forms "a," "an," and "the" include plural referents unless the context clearly dictates otherwise.

The term "cutting means" or "motor-driven cutting means" shall refer to any means known to the art that can be supported on the structures claimed herein, including but not limited to, a cutting chain or circular saw blades, or reciprocating saw blades. "GPS", an acronym specifically referring to the Global Positioning System maintained by the United States Government, may also refer to any satellite-based navigation system, which may or may not include an interface to, and thereby also encompass, an inertial navigation system (INS).

This disclosure describes a variety of embodiments of a limb cutting apparatus. The limb cutting apparatus embodiments vary from a hand-held cutting apparatus to embodiments suitable for large-scale trimming of tree growth in public and utility easements. The described features, structures, or characteristics of the invention may be combined in any suitable manner in one or more embodiments. In the following description, numerous specific details are recited to provide a thorough understanding of the embodiments of the invention. One skilled in the relevant art will recognize, however, that the invention may be practiced without one or more of the specific details, or with other methods, components, materials, and so forth. In other instances, well-known structures, materials, or operation are not shown or described in detail to avoid obscuring aspects of the invention.

Figure 1:
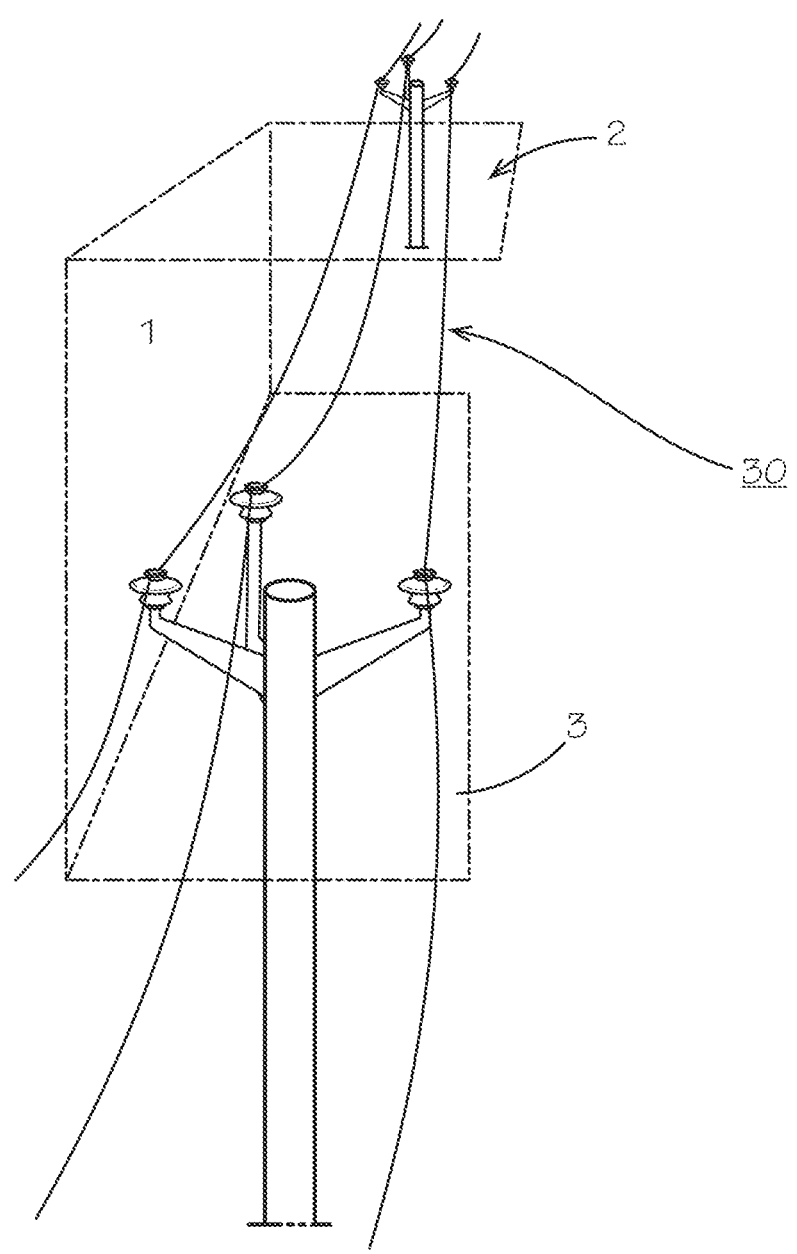
FIG. 1 illustrates power line easement cutting planes referenced in this disclosure.

In order to achieve efficiency, a stable vehicle adapted to travel parallel to a road, energized electrical conductors, or both supports a slewing and extending mechanism comprised of a plurality of articulated booms that are adapted to orient a linear cutting mechanism either horizontally or vertically. In most embodiments featuring a horizontally oriented linear cutting mechanism, a boom will translate vertically. In most embodiments featuring a vertically oriented linear cutting mechanism, the boom will translate primarily horizontally. In both cases, optimal boom design maximizes the efficiency of the cutting orientation. Since the booms, cutting head, linear cutting system, and other supporting devices may work together to create an efficient workflow, certain embodiments incorporating combinations of these devices may be referred to as a system. Herein the term "horizontal system," refers to embodiments or states in which the linear cutting system is permanently or temporarily horizontally oriented. The term "vertical system" refers to embodiments or states in which the linear cutting system is permanently or temporarily vertically oriented. Certain embodiments translate between horizonal and vertical systems. In each case, it is desirable for the cutting system to be able to efficiently access the limb cutting plane, e.g., the side cut plane 1, top cut plane 2, and bottom cut plane 3 as illustrated in FIG. 1.

Figure 2:
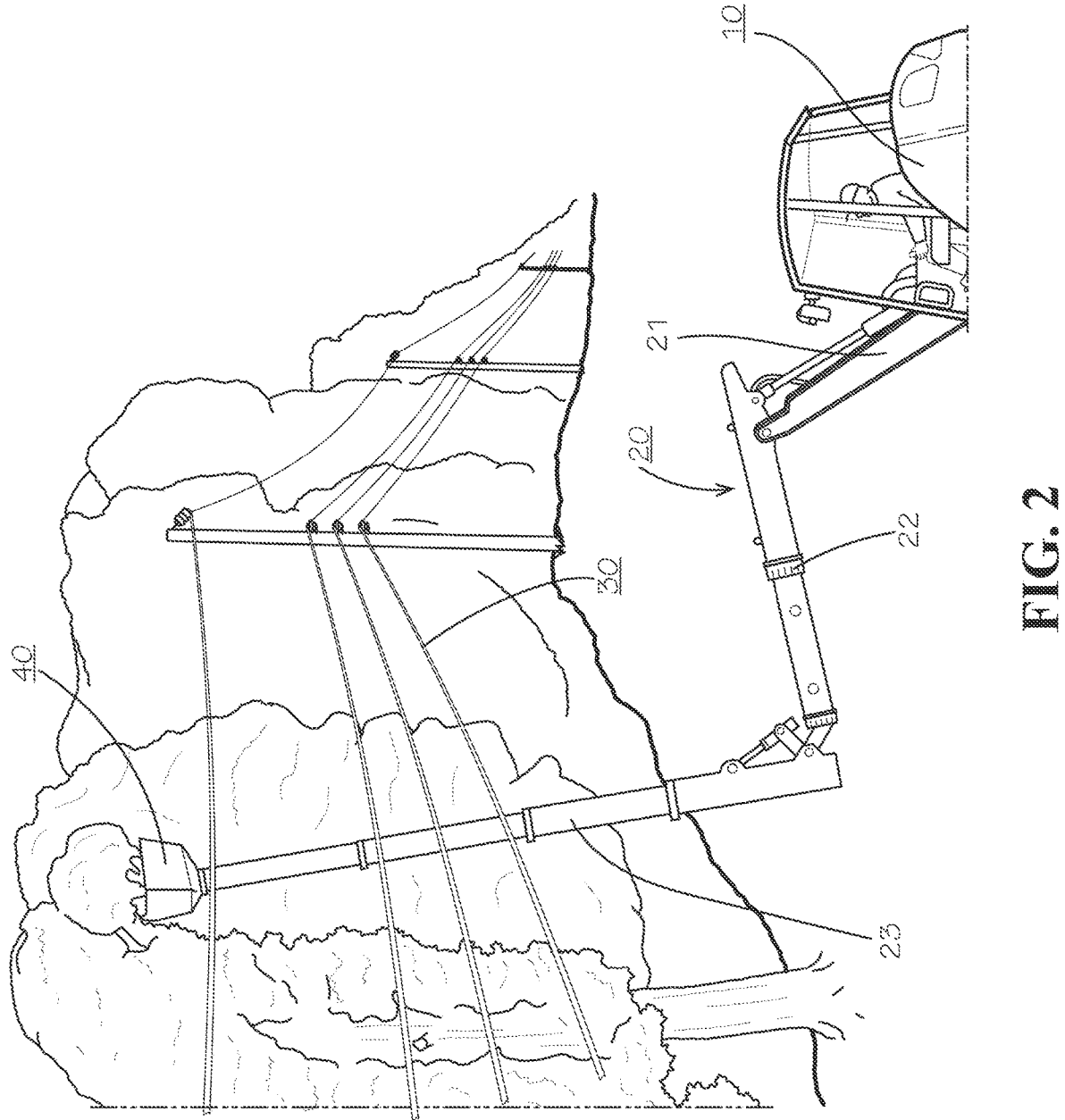
FIG. 2 shows one embodiment of a limb cutting apparatus employing an articulated boom and a cutting head mounted to a generic vehicle.

FIG. 2 depicts one embodiment featuring a vehicle with the booms mounted in a configuration amenable to power line work in which the system is being used to trim branches from the side cut plane 1 of a power line right of way. The apparatus comprises articulated boom 20, which is further comprised of a lower boom 21, mid-boom 22, and a telescoping jib section 23. There are numerous lower-boom configurations possible depending on the vehicle to which the machine is mounted. In FIG. 2, articulated boom 20 is depicted with the linear cutting mechanism in a horizontal orientation performing a vertical pass to remove tree branches in the side cut plane 1 which are encroaching on energized conductors 30. In this illustration, cutting head 40 and telescoping jib section 23 are disposed on the opposite side of the energized conductors 30, from the vehicle 10.

Figures 3, 4:
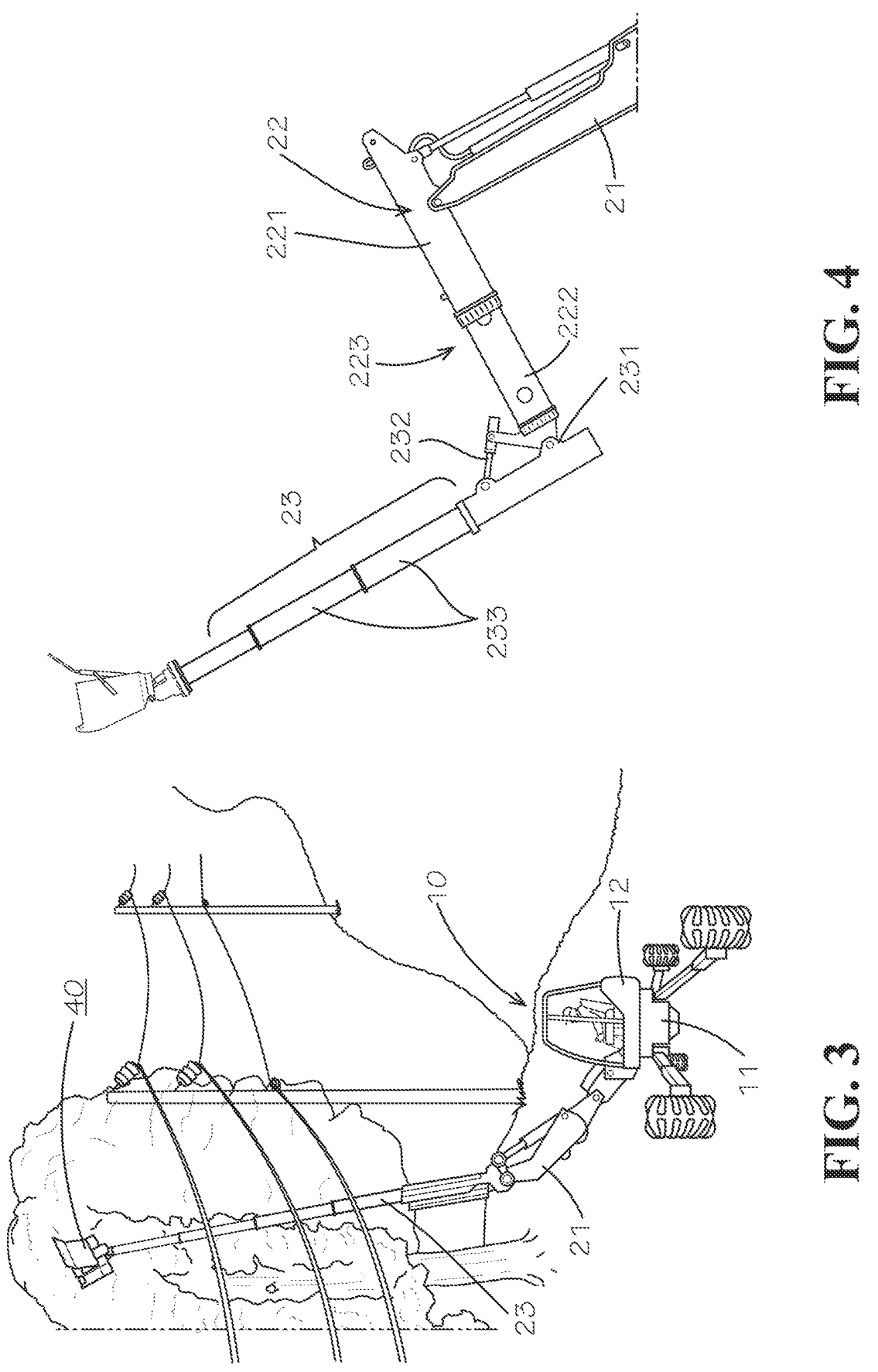
FIG. 3 illustrates a potential embodiment of a limb cutting apparatus mounted to a vehicle having separate articulated axles.
FIG. 4 is a detailed view of an embodiment of an articulated boom.

FIG. 3 shows an embodiment of the system featuring a vehicle 10 specially adapted for use in steep terrain. An example of vehicle 10 in this embodiment is a walking excavator vehicle featuring independent, telescoping, articulated axles that are manufactured by Manzi Muck AG based in Rüthi, Switzerland. A slewing bearing assembly (not illustrated) connects the slew drive 11 to the operator's cab and power unit (CAPU) 12. In the embodiment illustrated in FIG. 3, a simplified boom omitting mid-boom 22 is used, so that lower boom 21 is directly attached to telescoping jib section 23. As before, cutting head 40 is performing automated tree limb removal. The slewing bearing assembly in this particular embodiment further gives CAPU 12 one degree-of-freedom (e.g., rotational) about a vertical axis between the undercarriage and the power unit. In order to offset any destabilizing moments at maximum boom extension, Manzi Muck-style and other vehicles typically also employ stabilizing outriggers or counterweights.

Some embodiments of the invention may utilize a system in which the linear cutting mechanism is positioned in a horizontal orientation while moving vertically upwards, cutting limbs from below. This is referred to as a "horizontal system," because of the orientation of the linear cutting mechanism. This contrasts with systems in which the linear cutting mechanism is more nearly vertical and employs a side-to-side motion, or a "vertical system." In the case of a horizontal system, it is desired for the boom to feature maneuverability and flexibility within the planes parallel to the axis of rotation of the main slewing bearing of the vehicle. To accomplish this, articulated boom 20 described in greater detail below will assist in positioning the cutting head.

Articulated boom 20 must be capable of folding into a compact, retracted state, and also have sufficient reach (i.e., lateral extension relative to vehicle 10) to permit telescoping jib section 23 to be aligned with the desired cutting plane. FIG. 3 shows the lower boom 21 attached to CAPU 12 of vehicle 10. The lower boom 21 luffs (i.e., elevates) relative to CAPU 12 along a one degree-of-freedom hinge disposed in CAPU 12. Referring to FIG. 4, mid-boom 22—which is present in the embodiment shown in FIG. 2 but not in FIG. 3—may be comprised of a mid-base section 221, and a mid-extendable section 222. The mid-extendable section 222 may slide within the mid-base section 221 with the aid of an internal hydraulic cylinder and internal linear bearings 223, mounted within the interior extremity of the mid-base section 221. The internal linear bearings 223 may be constructed of nylon or other materials known to the art which are softer than the boom, to protect it when sliding occurs. The mid-extendable section 222 may also be constructed of an insulated material, such as a structural fiberglass, and may be long enough so that when fully retracted inside the mid-base section 221 it protrudes a minimal distance. Engineers may establish an electrical safety rating for the insulative qualities of this portion of the articulated boom 20 based on said minimum approach distance (MAD), the insulative qualities of the material chosen for the mid-extendable section 222, and insulative qualities of other nearby equipment such as the hydraulic hoses which pass through mid-boom 22. All together these components are known to the art to form an "insulated section" of boom, which protects the lower portion of the vehicle from phase-to-ground electrical shorts, which can damage the vehicle and severely injure its operator.

An extendable jib section 23 may comprise the final leg of the "Z" of the articulated boom 20 as shown in FIG. 4. Extendable jib section 23 is comprised of multiple telescoping segments 233. From the extremity of the mid-extendable section 222, the extendable jib section 23 may be luffed about the pivot pin 231, by the jib-luffing hydraulic cylinder 232.

The lower boom 21 may be comprised in part from the vehicle's existing boom or be integrally manufactured with the other components of articulated boom 20. The lower boom 21 is typically mounted to CAPU 12 at a height between 4 and 15 feet (approximately) above the ground. Using the lower boom 21 and mid-boom 22, the articulated boom has a lateral reach of some 8-10 feet past the undercarriage or outriggers, from which point the extendable jib section 23 may be extended vertically. Cutting head 40 is mounted to telescoping jib section 23 using a pivot joint having one or preferably two degrees of freedom. Telescoping jib section 23 is comprised of multiple telescoping segments 233 which extend vertically approximately 60 feet in one embodiment. This results in a pruning height of 65 to 80 feet, depending on terrain, undercarriage height, and the luffing angles of the lower boom 21 and mid-boom 22. Although mid-boom 22 may luff with respect to the lower boom, it may be desirable to incorporate a limiting device to prevent inclining the cutting head 40 too much past vertical resulting in excessive tipping moment on the vehicle and/or outrigger supports.

The geometry of the articulated boom 20 design allows the cutting head 40 to be used in areas where minimal horizontal clearance exists, such as is often found between communication or secondary lines on utility poles. This means that when performing horizontal passes, articulated boom 20 allows precise manipulation of the cutting head 40 with respect to nearby obstacles. Furthermore, the design of articulated boom 20 allows for efficient completion of multiple vertical passes, allowing cutting head 40 to accomplish as much pruning in an hour that would currently take a crew of three workers a full day to accomplish with existing equipment.

One embodiment of cutting head 40 is illustrated in FIGS. 5-8. One exemplary embodiment of cutting head 40 has a width of 8 feet, depth of 2 feet, and length of 3 feet, and is affixed to the end of extendable jib section 23 as described above. As shown FIGS. 5 and 6, cutting head 40 is shaped somewhat similar to an excavator bucket having a front wall 401, side walls 402, and an articulated rear wall 42 that is movable by at least one rear wall hydraulic actuator 43. Front wall 401, side walls 402, and articulated rear wall 42 define a receptacle 47, which will be described in greater detail below. In this embodiment, cutting apparatus 41 is integrated into the upper edge of front wall 401.

Figures 5, 6:
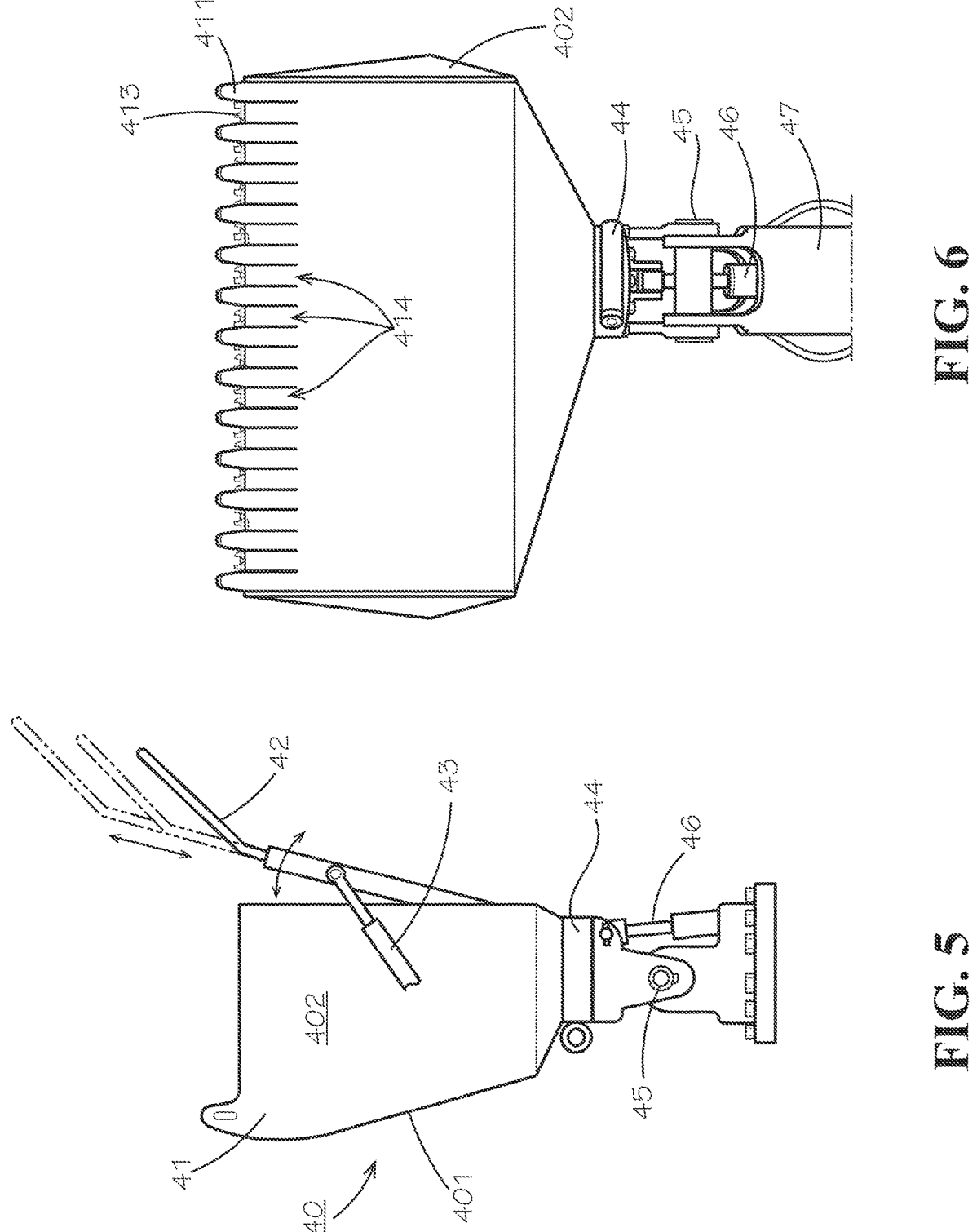
FIG. 5 is a side elevation view of the cutting head, including one embodiment of an articulated anti-pinch mechanism.
FIG. 6 is a front elevation view of one embodiment of the cutting head.
Figure 7:
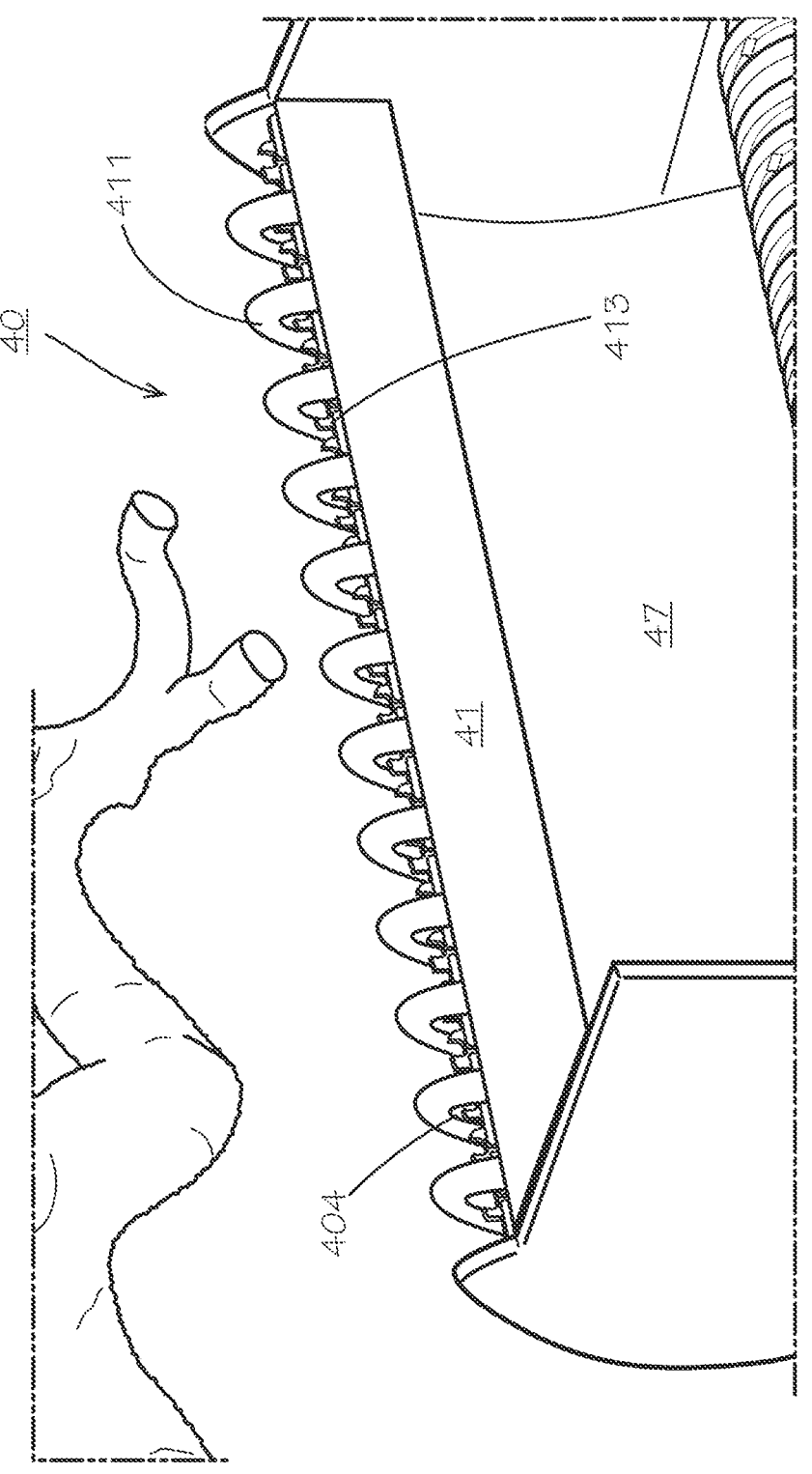
FIG. 7 is an illustration of the cutting head linear cutting mechanism illustrating an embodiment of anvils incorporating holes through which a cutting chain can pass.

As shown in FIG. 5, the upper edge of articulated rear wall 42 may also extend relative to a lower edge, i.e., articulated rear wall 42 consists of telescoping flat sections. The extendable upper edge of articulated rear wall 42 provides support for the distal portion of a limb that is being cut by the cutting apparatus 41 incorporated into the cutting head, thereby reducing the risk of heavier limbs pinching the cutting apparatus 41.

Cutting head 40 is attached to extendable jib section 23. As shown in FIGS. 5 and 6, it is articulable in two degrees of freedom via slew drive 44, which rotates cutting head 40 about one axis, and a cutting head tilt hydraulic actuator 46 which rotates cutting head in a second axis defined by pivot 45. Slew drive 44 allows the cutting head 40 to rotate about one axis that is roughly parallel to the direction of cut.

The embodiment of cutting head 40 illustrated in FIGS. 5 through 8 collects and processes pruned tree limbs and is designed to prevent snagging and pinching of the cutting apparatus 41 while cutting operations are in progress. These embodiments of the cutting head are generally limited to a maximum width of 8 feet to ensure that it is roadable, i.e., able to be transported over public roads. To accommodate the processing equipment, a nominal depth of 2 feet and height of 3 feet may be adequate.

In a typical application involving trimming branches from side plane 1, mid-boom 22 is luffed to a horizontal position (i.e., parallel to the ground), and mid-extendable section 222 is extended laterally relative to vehicle 10 until jib section 23 is aligned with the desired side plane 1, then multiple telescoping segments 233 are extended. As the cutting head 40 extends upwardly in the side plane 1, cutting apparatus 41 severs any branches which protrude into side plane 1. Severed branches fall into a receptacle 47 illustrated in FIGS. 7 and 8 that is in the cutting head 40.

Figure 9:
FIG. 9 is a three-view illustration of one embodiment of an attachable anvil.
Figure 9:
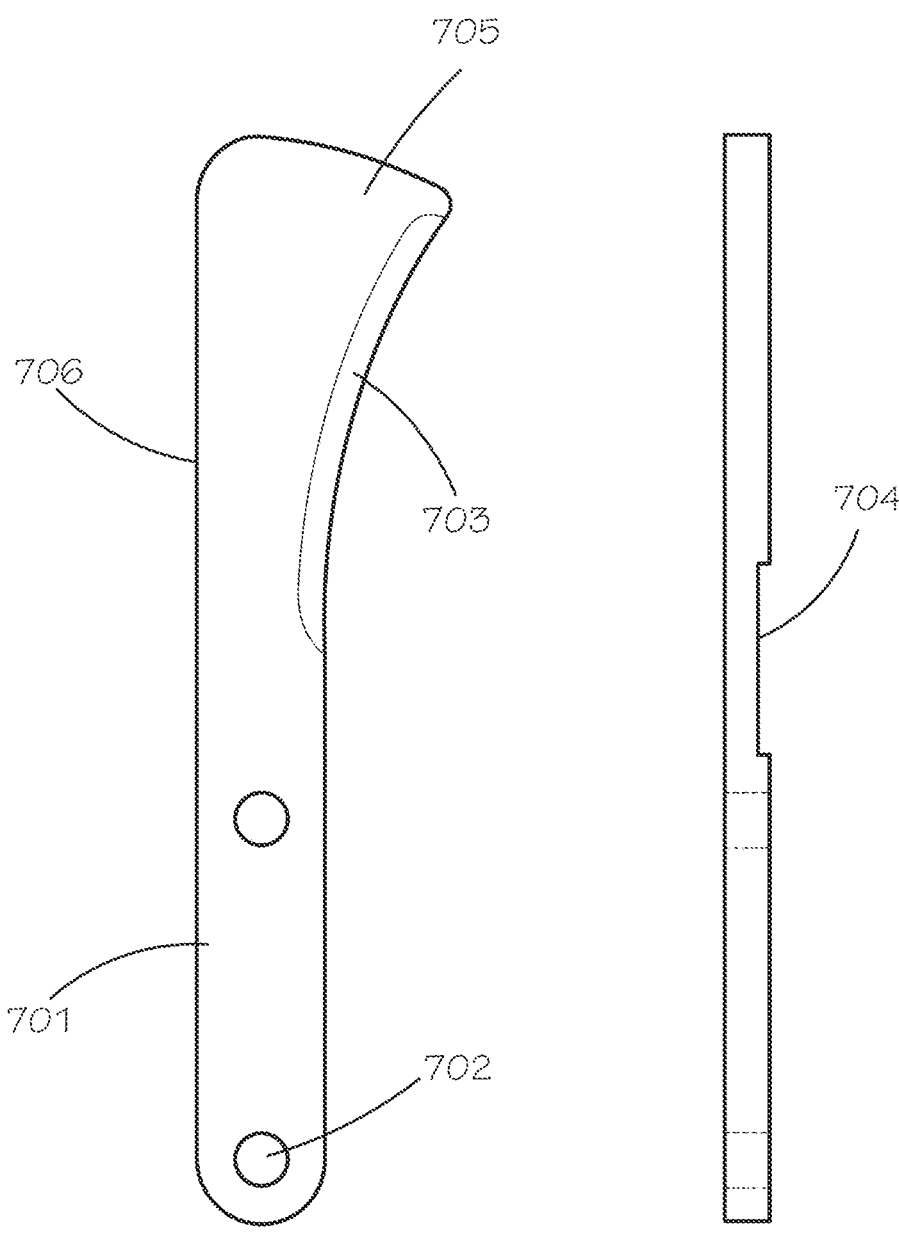

Those skilled in the art will appreciate using a chainsaw to cut heavy cantilevered branches from the bottom leads to pinching of the cutting chain. Moving cutting head through dense tree canopy also may result in snagging of the cutting head on branches. Therefore, embodiments of the cutting head 40 feature structures specifically designed to assist in the lifting of branches to prevent pinching. To overcome the snagging issue, cutting head 40 has a unique shape and multiple, operator-controlled degrees of freedom. Referring now to the embodiment illustrated in FIG. 7, the upper front edge of cutting head 40 incorporates cutting apparatus 41 that is further comprised of a set of protruding structures referred to herein as anvils 411, the space between the anvils referred to herein as pockets 412, and a motor-driven cutting chain 413 being driven around a cutting bar 91. The projecting portion of anvils 411 extending away from the cutting bar 91 or the cutting chain 413 along an extended axis that is substantially perpendicular to the cutting bar may be referred to as the crown. In some embodiments where anvils 411 are disposed obliquely across the leading edge of cutting head 40, cutting chain 423 passes through holes 404 in the anvils 411. In other embodiments such as those shown in FIGS. 9-12, cutting chain 423 passes through a notch 704 that is incorporated into the shape of the anvils 411 themselves, as illustrated in FIG. 9. The shape of the crown of anvils 411 is three dimensional with an orientation along a defined plane, which may or may not align with the plane in which cutting bar 91 lies.

Figures 10, 11:
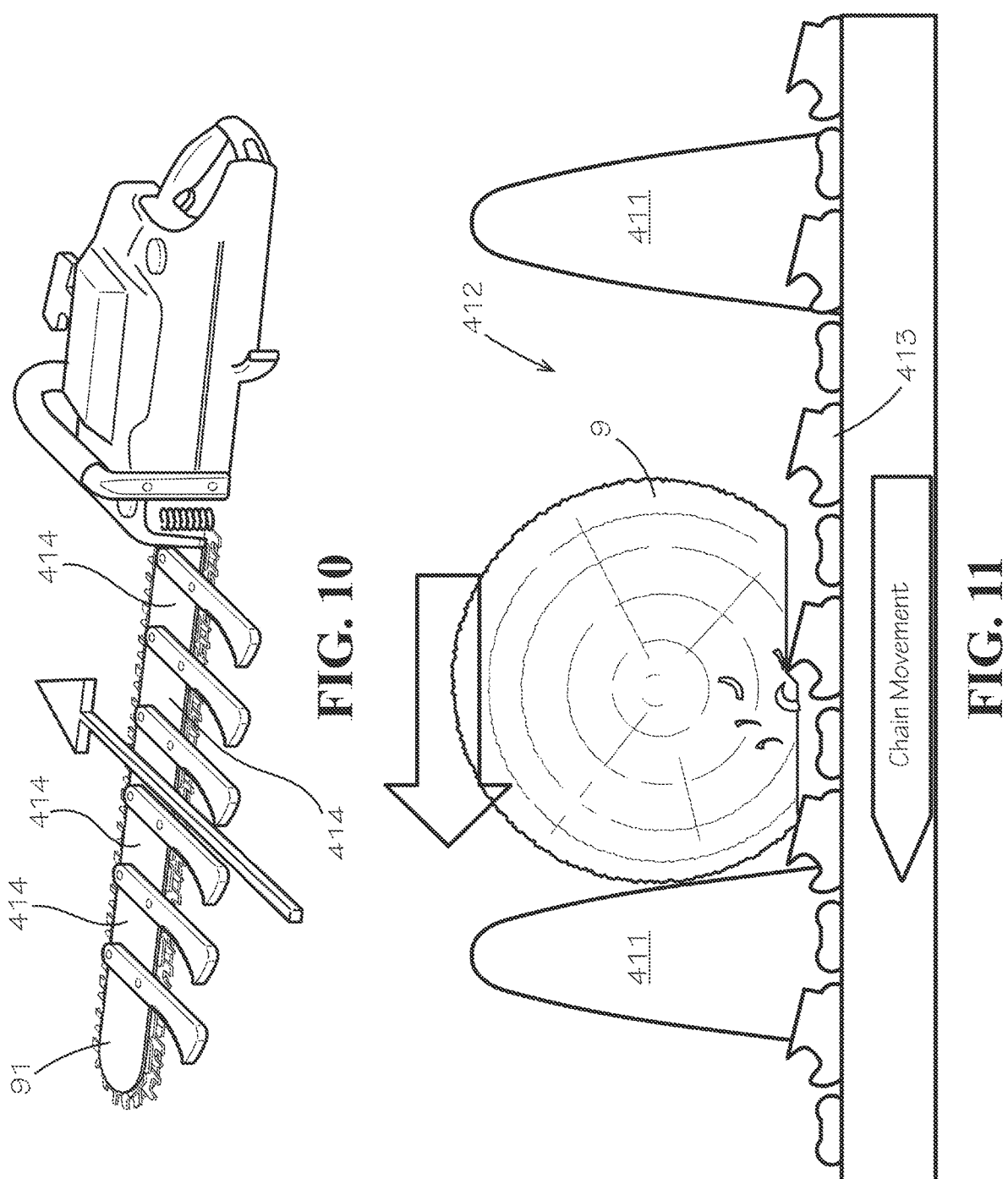
FIG. 10 illustrates cutting channels according to one embodiment of the cutting mechanism.
FIG. 11 illustrates how the anvils counter the reaction force exerted on the cut material by the cutting chain in one embodiment.

Anvils 411 have two primary functions. First, anvils 411 reduce snagging. FIGS. 5-9 illustrate how the shape of anvils 411 is designed for rubbing and/or passing over trunk wood and scaffold branches without marring them. In the embodiments shown, the anvils are obliquely curved and rounded to minimize bark damage. Second, as one skilled in the art will realize, when a fast-moving cutting chain 413 is applied to a small branch, the reaction force of the high-speed cutting chain 413 as it contacts a branch will produce sideward acceleration of smaller branches. Sideward acceleration usually results in an undesirable cut. The anvils 411 therefore pin and hold branches while the cutting chain 413, which is motor driven similar to a chainsaw chain, severs the branches more precisely as illustrated in FIG. 11. Thus, the "comb" design resulting from the combination of anvils 411 and pockets 412, which with cutting chain 413 the drive motor (not illustrated) for cutting chain 413, allow the cutting head 40 to precisely position and then sever small limbs. Anvils 411 can be incorporated directly into the structure of cutting head 40, as in the embodiments shown in FIGS. 5 through 8. However, anvils 411 may also be distinct structures, as shown in FIGS. 9, 10, and 12-15, that are capable of being attached (e.g., bolted) to a face of cutter bar 91. In the embodiments shown in FIGS. 10-16, cutter bar 91 is a supporting structure for a motor-driven cutting means such as a cutting chain, a circular saw blade, or a reciprocating saw blade. Cutter bar 91 features a substantially flat front face or substantially flat rear face and is elongated along a long axis. Depending on the embodiment, cutter bar 91 can be attached at one or both of its elongated ends. In the embodiments featuring a motor-driven cutting chain 413, cutter bar 91 is attached at one end. The attached end generally supports or is proximate to the drive sprocket for cutting chain 413. In such embodiments, the free end of cutter bar 91 permits cutting chain 413 to travel around the perimeter of cutter bar 91, similar in manner to a chain saw. In the embodiment shown in FIG. 16, the cutter bar 91 supports one or more circular saw blades 161, with anvils 411 disposed between each adjacent blade.

Referring to the embodiment illustrated in FIG. 6, cutting channels 414 extend downwardly from the pockets 412. Cutting channels 414 prevent snagging of the cutting head 40 on limbs that are being trimmed and are therefore on both sides of cutting apparatus 41. In certain embodiments, the bottom of cutting channels 414 correspond to the flat front and rear faces of cutter bar 91 and the sides of cutting channels 414 are formed by adjacent anvils 411. The geometric relationship of the anvils 411 and cutting channels 414 ensure that the cutting head 40 can only cut limbs having a diameter less than the width of the pockets 412. In this case, the limbs are sure to pass through cutting channels 414. Another embodiment of cutting channels 414 are illustrated in FIG. 10, which illustrates use of anvils 411 retrofitted to a chain saw cutter bar 91. The arrow indicates the direction of motion of the cut material through the cutting channels 414 in this embodiment.

Figure 8:
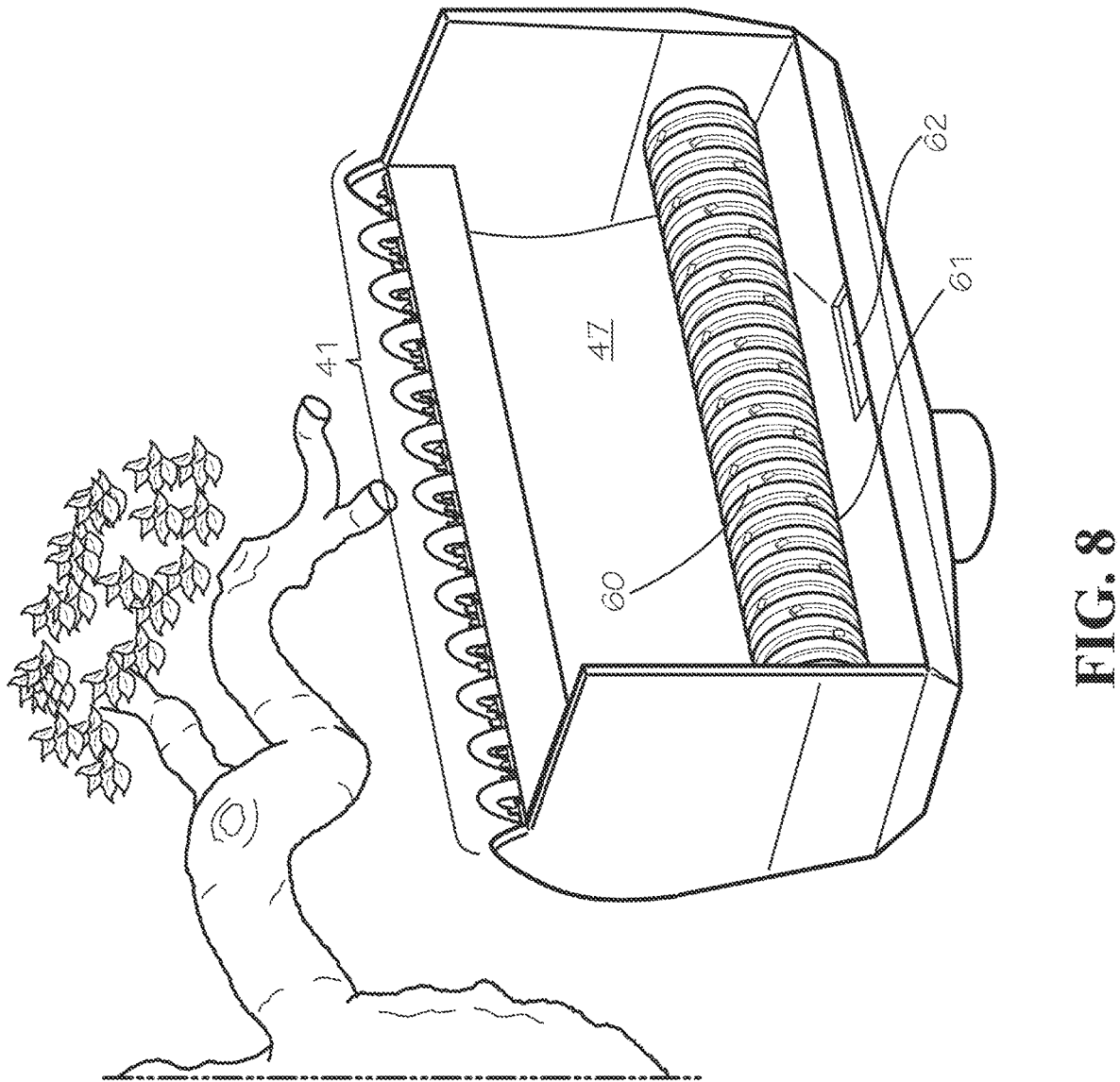
FIG. 8 illustrates an embodiment of the cutting head incorporating a chipping mechanism

A specific embodiment of anvil 411 that may be retrofitted to a chain saw is illustrated in three-view in FIG. 9. This embodiment is approximately 6.5 inches long, 0.25 inches thick, and is 0.75 inches wide at the attachment point, expanding to approximately 1.5 inches at the distal end. Tang 701 has two bolt holes 702 which allow the anvil to be bolted to the linear cutting mechanism. A lower front edge 703 of anvil 411 in this embodiment is beveled at 59 degrees from the horizontal, and the two bolt holes 702 for attachment are 0.33 inches in diameter with 2 inches between centers. Immediately above the tang 701 is a notch 704, which accommodates cutting chain 413. This is because in most embodiments, cutter bar 91 of cutting apparatus 41 is narrower than cutting chain 413, i.e., cutting chain 413 is wider than cutting apparatus 41. Anvil 411 also features an upper front edge 705, and a rear edge 706. In this embodiment upper front edge 705 is a convex curve, while lower front edge 703 is concave curve, while rear edge 706 is straight. Other embodiments are possible, e.g., a linear upper front edge 705, curved concave lower front edge 703, convex curved rear edge 706. After the cuttings are collected and directed into receptacle 47, certain embodiments allow cuttings to be chipped and stored within it. FIG. 8 shows a chipping system incorporated into cutting head 40. In this embodiment, chipping drum 60 rotates against the bed knife 61, which is typical in the art. Likewise, a grate system may be employed with a gravitational exit 62. The chipping drum 60 may extend most of the width of the cutting. Slower-speed chipping drums, and/or narrower chipping drums could also be used. Chips generated by chipping drum 60 could then be released from a trap door at the bottom or released by inverting cutting head 40. Although not pictured, cutting head 40 may also include forwarding equipment to ensure all trimmings are forced towards the chipping drum.

Branch binding is always a consideration when employing cutting apparatus 41. Branch binding occurs when a branch is cut from below. Because branches are naturally cantilevered members, the top of the branch is in tension, while the bottom of the branch is in compression. Therefore, when a branch is cut from below, this compressive force is exerted on either side of the cutting apparatus 41, resulting in branch binding. Branch binding is a problem because it can not only cause binding of cutting chain 413, but it can also result in the cutting apparatus 41 becoming stuck inside a limb.

Cutting head 40 in the embodiment shown is typically intended to cut limbs with a nominal maximum diameter of 1", for which the issue of branch binding is not serious. However, to cut limbs with a larger diameter, it is desirable that provisions be made to prevent branch binding or otherwise avoid cutting branches from the bottom. For branches between 1" and 2", with a nominal length less than the nominal cutting depth, the apparatuses described below in the section entitled, "The Cutting Mechanism" describe a potential embodiment which overcomes the issue. For limbs longer than the nominal cutting depth, cutting head 40 employs articulated rear wall 42 as shown in FIG. 5, which depending upon the embodiment, may accomplish one or more of the following:

1. Pushing up on the bottom sides of limbs—with the possible aid of a rear wall hydraulic actuator 43—thereby providing support to the limb, allowing the chain to cut the underside of each limb with minimal binding; and,
2. Creating a fulcrum further from the saw that will encourage limbs which may be longer than the nominal cutting depth to fall into the receptacle after successful severing; and,
3. Retain any loose branch material that falls partially outside the receptacle; and,
4. Provide a means, by closing the articulated rear wall 42, of compacting the trimmings and forcing them into the chipping/processing equipment to ensure that all cut branch material is processed. This would be accomplished by either automatic or manual operation of rear wall hydraulic actuator 43.

FIG. 5 depicts one embodiment of articulated rear wall 42 of cutting head 40. As shown in FIG. 5, articulated rear wall 42 features both linear and rotational degrees of freedom. Rear wall hydraulic actuator 43 is only shown for the rotational degree of freedom, while linear translation of articulated rear wall 42 may be accomplished through springs, gas-filled struts, hydraulic cylinders, solenoids, or any combination thereof. The potential planes and directions of movement shown in FIG. 5 are for one potential embodiment only. The operator could retain direct control over those functions, or automatically activated movement could assist smooth cutting through larger cantilevered limbs.

Cutting apparatus 41 allows for efficient planar cutting of multiple branches of varying diameter within a continuously moving operation. The cutting apparatus 41 may comprise a linear cutting chain 413 or a series of circular saw blades (see FIG. 16). As illustrated in FIG. 11, anvils 411 and pockets 412 are designed to comb through foliage, pin any interceding branches 9, so that cutting chain 413 or circular saw blades cut through them.

Figure 12:
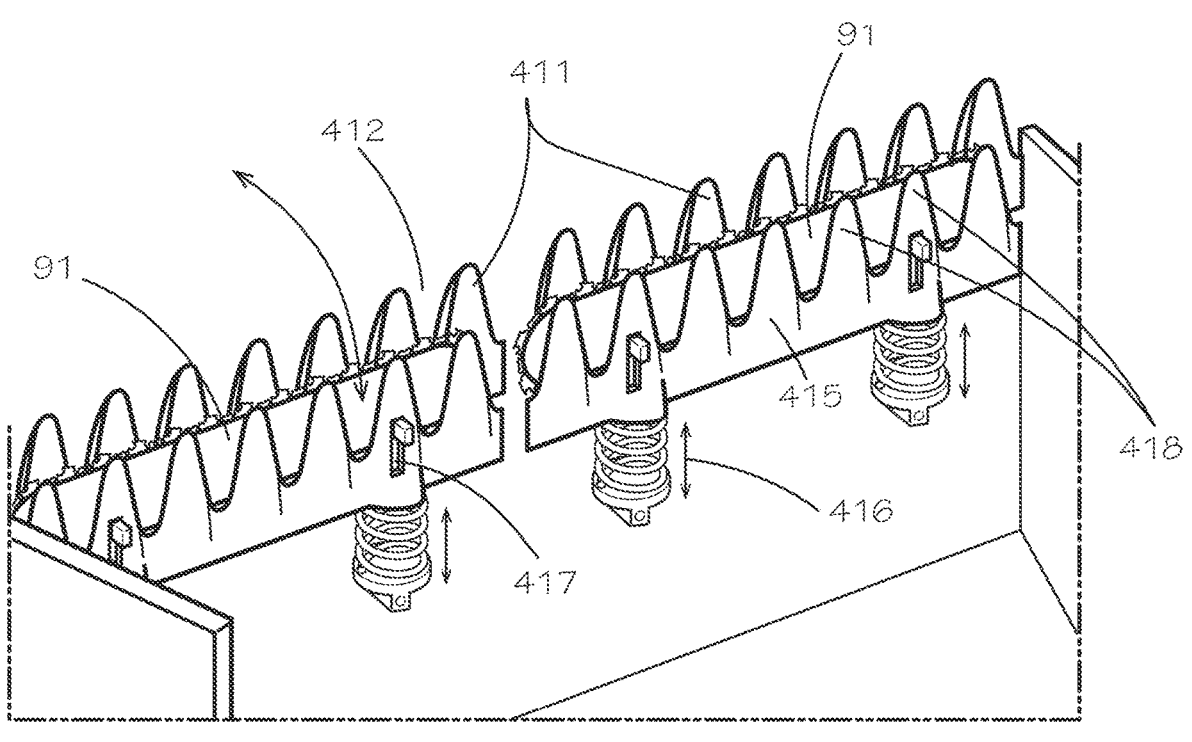
FIG. 12 is a perspective illustration of an embodiment of the cutting head featuring an alternate embodiment of an anti-pinching mechanism.
Figure 12A:
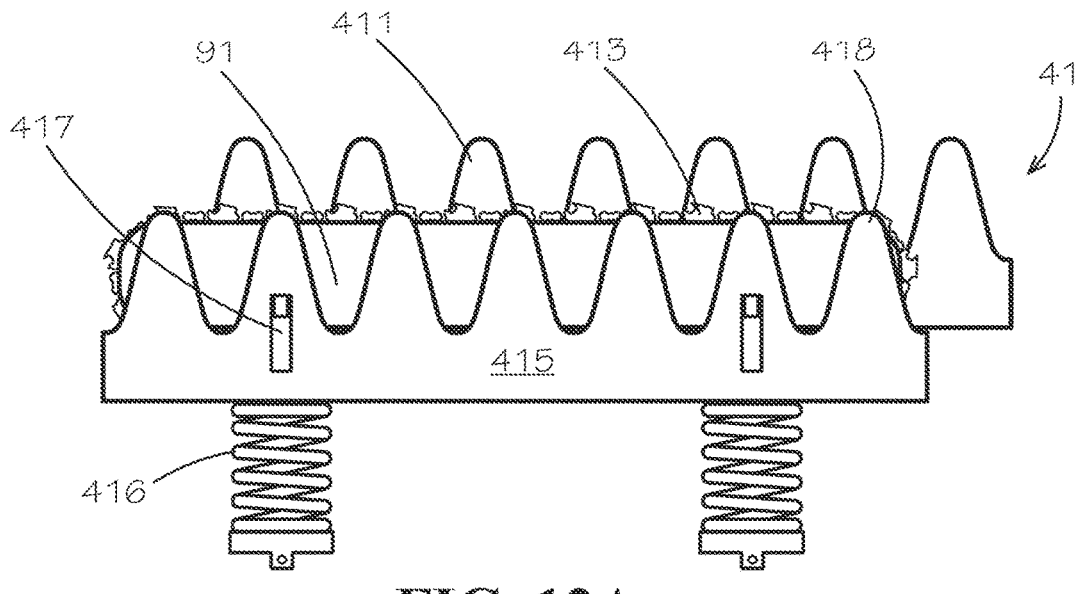
FIG. 12A is a plan view of the cutting head embodiment illustrated in FIG. 12.

FIGS. 12 and 12A depict another embodiment of cutting apparatus 41 comprising multiple cutter bars 91, around which cutting chain 413 is constrained to translate in the fashion of a chain saw. Cutter bars 91 in this embodiment are located between a first set of anvils 411 and an anti-pinching bar 415, which incorporates anti-pinching projections 418. The purpose of the anti-pinching projections 418 is to exert upward pressure on a limb, thereby reducing the risk of pinching. Where cutting apparatus 41 cuts limbs from beneath, pinching will begin to occur with limbs having a diameter of greater than about 1.25 inches. To overcome this, anti-pinching bar 415 is located on the opposite side of the bar from the first set of anvils 411. The frequency and offset of the anti-pinching projections 418 relative to the first set of anvils 411 permit the nominal cutting width to be varied. Anvils 411 may protrude higher than the cutting bar/cutting chain in the direction of the cut path, while the anvils of the anti-pinching bar 415 may trail the cutting means by an inch or so. In one embodiment, the anti-pinching projections 418 are aligned with the pockets 412 of the first set of anvils 411. Anti-pinching bar 415 is capable of translating vertically via a pair of slots and linear bearings 417. Springs 416 are sized to provide pressure on the limbs according to their size, exerting greater pressure on the tree limbs that are larger. In some embodiments, linear springs are sufficient, while in some applications, non-linear springs providing variable resistant force versus displacement may be desirable. As a result, small limbs will pass between the anvils all the way to the bottom of pocket 412. Thus, cutting chain 413 will cut through small limbs with no upwards pressure exerted on them by the anti-pinching bar 415. On the other hand, medium-sized branches will not be able to fit entirely between the gap between the second set of anvils and the pockets of the first set, so the anti-pinching bar 415 will exert an intermediate level of upwards force that should be sufficient to mitigate or prevent binding of the limb. Large limbs will experience the greatest upwards force from the anti-pinching bar 415 because they will not fit into the pockets 412 without fully contacting the anti-pinching projections 418 of the anti-pinching bar 415. The movement of the anti-pinching bar 415 is shown with bidirectional arrows in FIG. 12.

Figure 14:
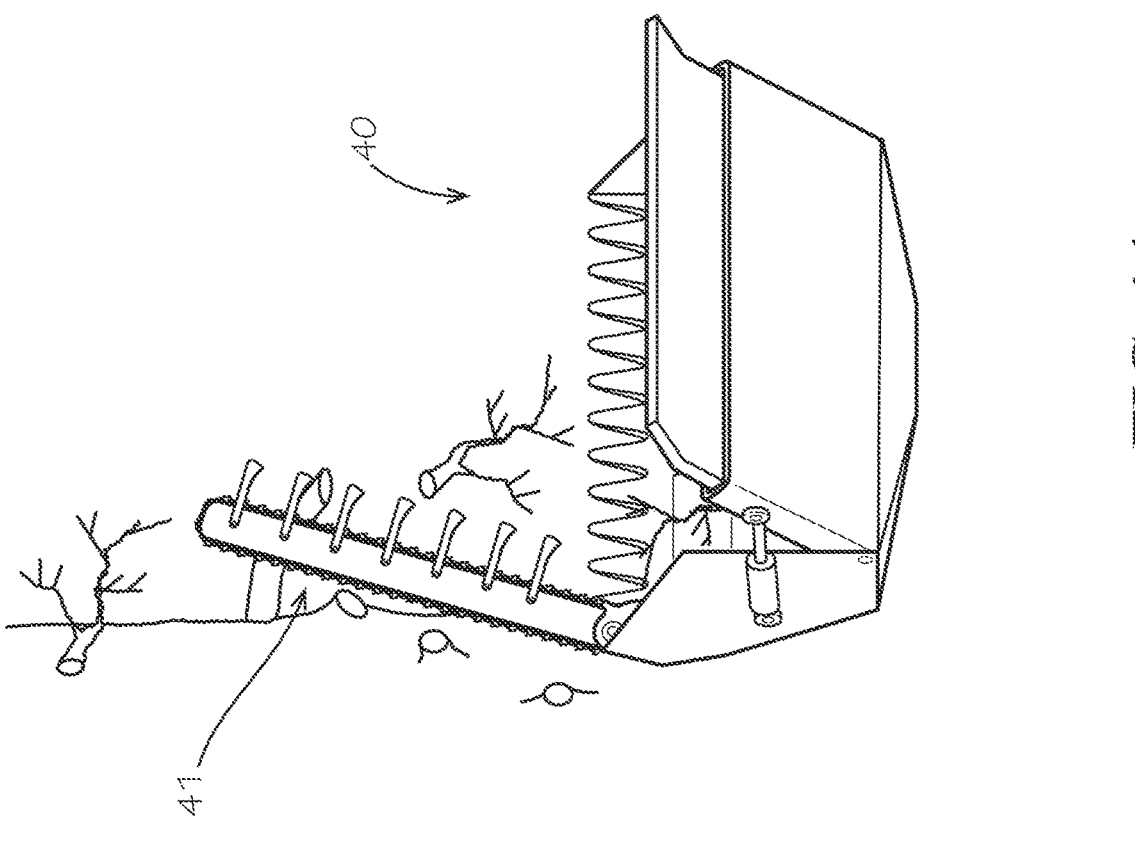
FIG. 14 illustrates an alternate embodiment of the cutting head incorporating the embodiment of the cutting mechanism illustrated in FIG. 13.
Figure 13:
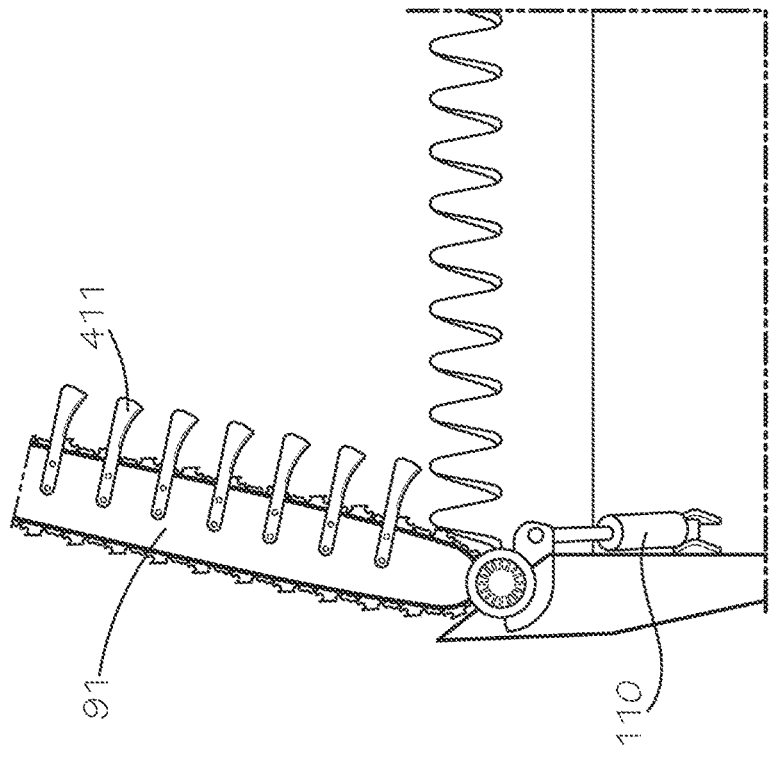
FIG. 13 illustrates an alternate embodiment of the cutting mechanism in which the cutter bar pivots at one end to accommodate both vertical and horizontal cutting operations.
Figure 13:

In this embodiment, cutter bars 91 can be actuated (e.g., using a hydraulic piston) so that they rotate upwardly and away from anvils 411, as shown by the bi-directional arrow in FIG. 12. This permits manual cutting of limbs from the top instead of from beneath, thereby avoiding branch pinching. The bar may be actuated by a hydraulic piston 110, as illustrated in FIG. 13. Additional options become available to the operator with this embodiment, such as pruning larger limbs, or addressing other issues separate from the usual trimming operation. FIG. 14 illustrates this embodiment incorporated into cutting head 40. Note that in the embodiments illustrated in FIGS. 13 and 14, anvils 411 are directly bolted to cutter bar 91. In this embodiment, the anvils 411 will typically have the form illustrated in FIG. 9, as discussed above.

The cutting apparatus 41 has a maximum cut size equal to the width of pockets 412 as shown in FIG. 11. For example, this distance could be 6". This distance will be referred to herein as the "nominal cutting width," and the "nominal cutting depth" when referring to the maximum depth of the cutting channel 414. The movement of the cutting means (e.g., cutting chain 413)—may be used to stabilize the branches for cutting, and in some embodiments to position limbs against the anti-pinching bar 415.

Some embodiments may feature a linear cutting mechanism is oriented vertically while the boom translates horizontally, cutting limbs from the side or angled from the top. This is referred to herein as a "vertical system," because of the orientation of the linear cutting mechanism. This contrasts with systems in which the linear cutting mechanism is more nearly horizontal and translates vertically, or a "horizontal system." In the case of a vertical system, the articulated boom 20 may be configured into longer embodiments but will lack flexibility to perform an undulation maneuver around obstacles present in the cut path. An undulation maneuver performed by a horizontal system involves a series of vertically oriented cuts, where a horizontal translation occurs after each cut. This allows obstacles to be avoided but is more time-consuming. On the other hand, in certain types of terrain, using a longer, vertically oriented linear cutting mechanism will enable more distance to be covered in less time. In these situations, it is more efficient to have the linear cutting mechanism oriented vertically, while the supporting vehicle translates parallel to the plane of the cut.

Figure 15:
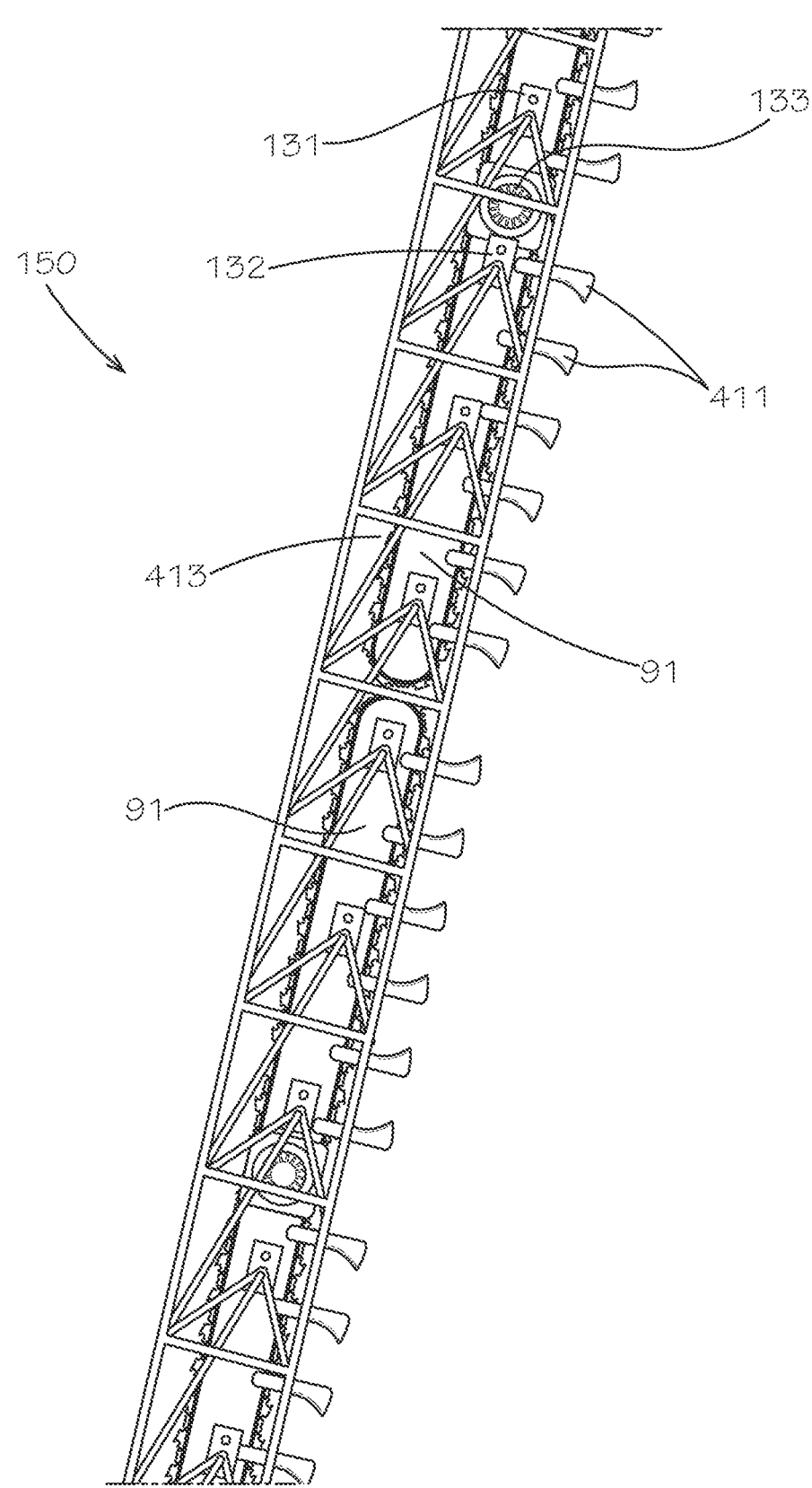
FIG. 15 illustrates an embodiment featuring multiple cutting mechanisms disposed in a linear boom configuration suitable for large-scale easement trimming operations.
Figure 16:
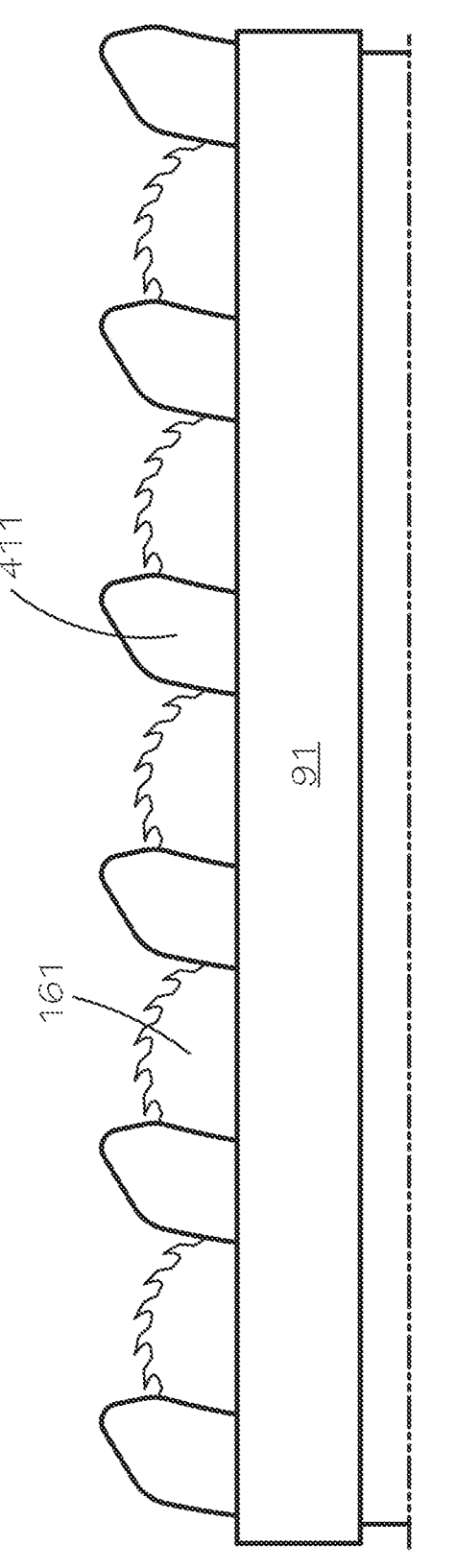
FIG. 16 illustrates an embodiment of the linear cutting mechanism using a series of circular saw blades as the cutting means.

A long cutting head 150 is in the form of a lattice boom embodiment that is illustrated in FIG. 15, and is a vertical system comprised of one or more hydraulic motors, each driving one or more extended-length cutter bars 91, via a power couple 133. The cutting chain 413 of adjacent cutter bars 91 may be driven either in the same or opposing directions. Cutter bars 91 are supported by a lightweight supporting lattice boom 131 with a triangular cross-section where the lattice boom is attached to cutter bars 91 at junction plates 132. The anvils 411 are mounted directly to cutter bars 91, and a system for forwarding the trimming downwards (such as a boom and conveyor illustrated in FIG. 20) may be used to minimize debris. While a lattice-boom is pictured in this embodiment, several different structural support designs could work to accomplish the objective of supporting multiple linear cutting mechanism in series to lengthen the effective cutting edge. A receptacle 47 may also be used in conjunction with this embodiment, whether disposed along the long axis of the lattice boom, but more likely at the base of the lattice boom.

There are situations in which the initial investment involved to create a uniform cut path may be justified by the ease and rapidity with which later pruning operations can be accomplished through the use of a longer-boom vertical system. FIGS. 17-21 depict the way that this process could work.

Figure 18:
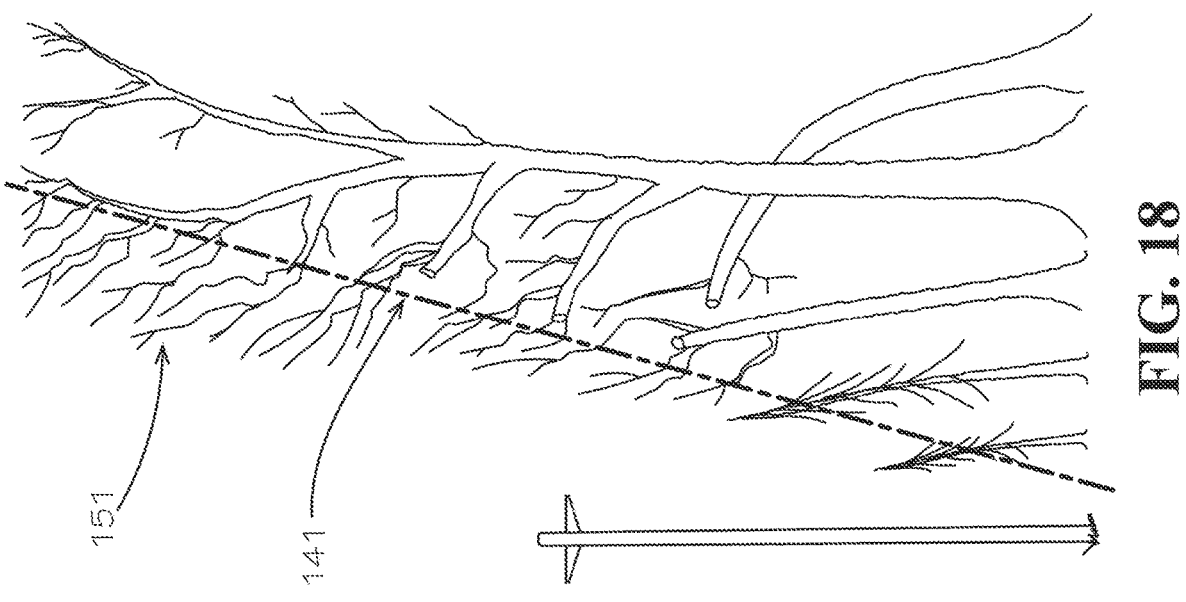
FIG. 18 illustrates step two of three in a method for achieving a planar right-of-way cut in which regrowth into the right-of-way occurs after manual trimming with one embodiment of the linear cutting mechanism.
Figure 17:
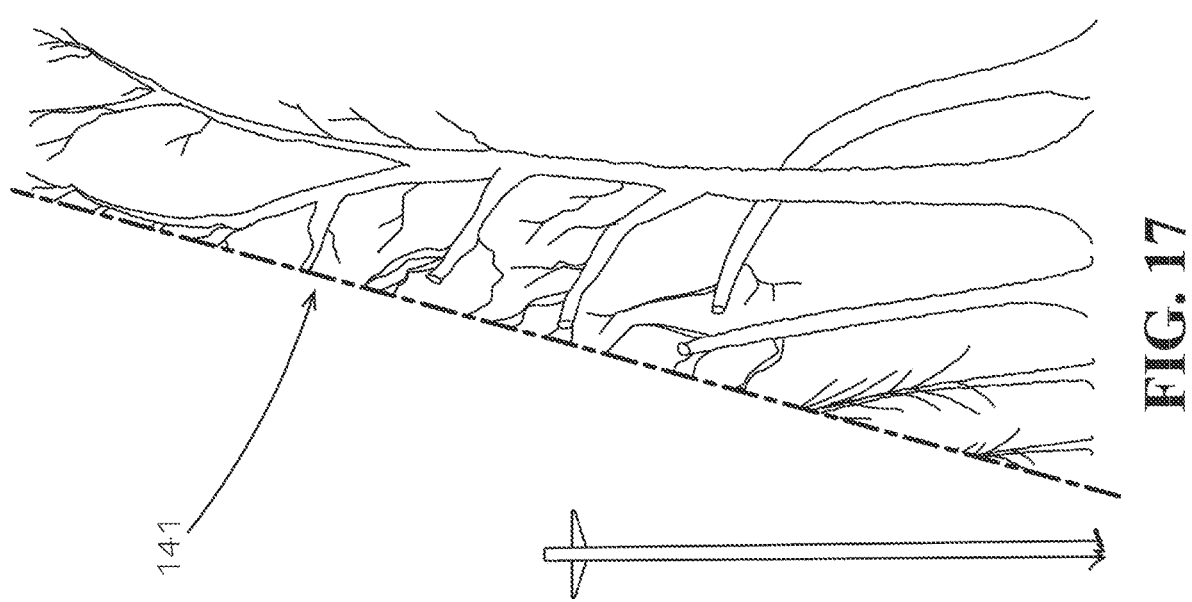
FIG. 17 illustrates a step one of three in a method for obtaining a planar right-of-way cut with one embodiment of the linear cutting mechanism.
Figure 19:
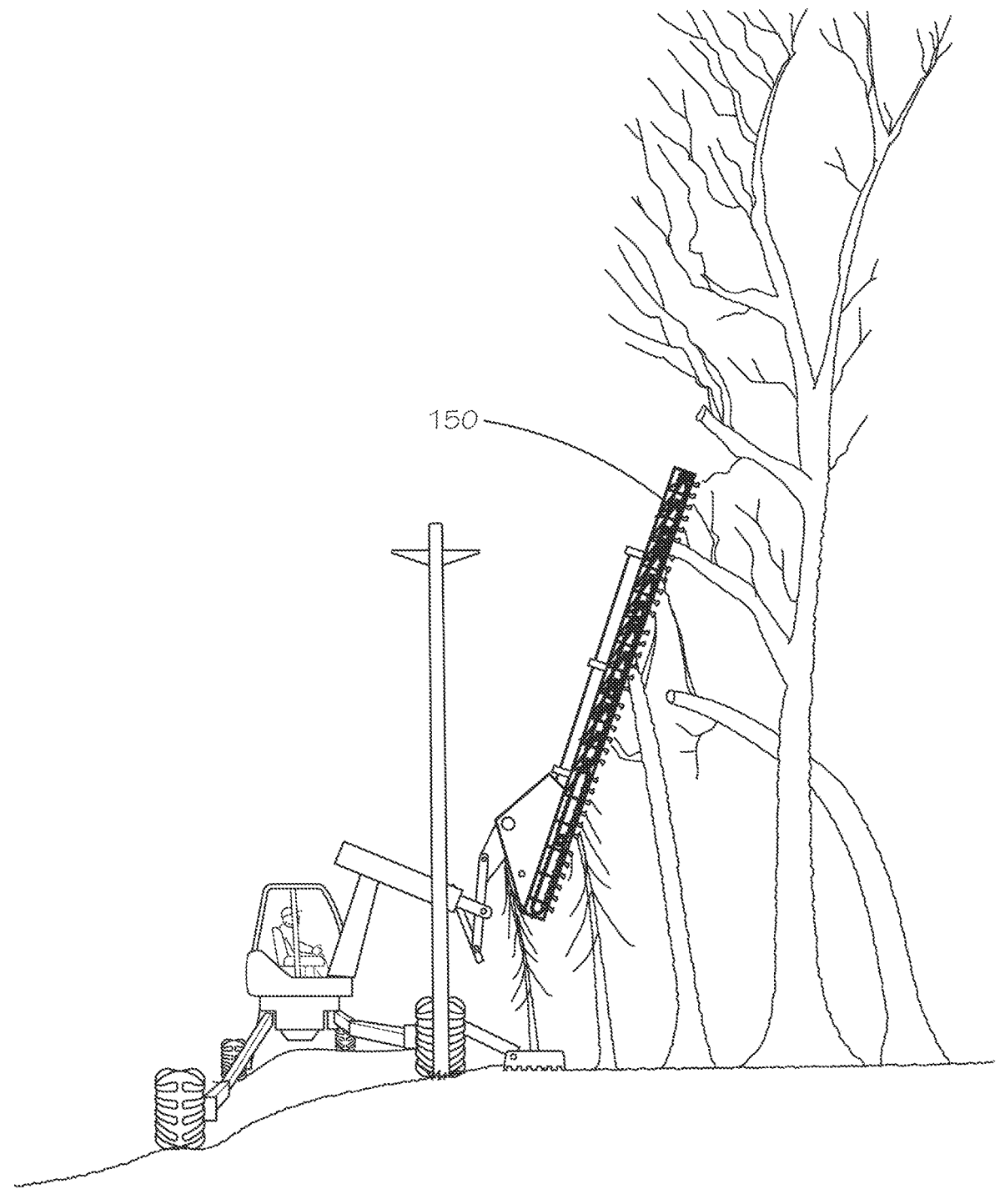
FIG. 19 illustrates step three of three in a method for obtaining a planar right-of-way cut in which the cutting mechanism is used in a linear boom configuration for ongoing maintenance trimming.
Figures 20, 21:
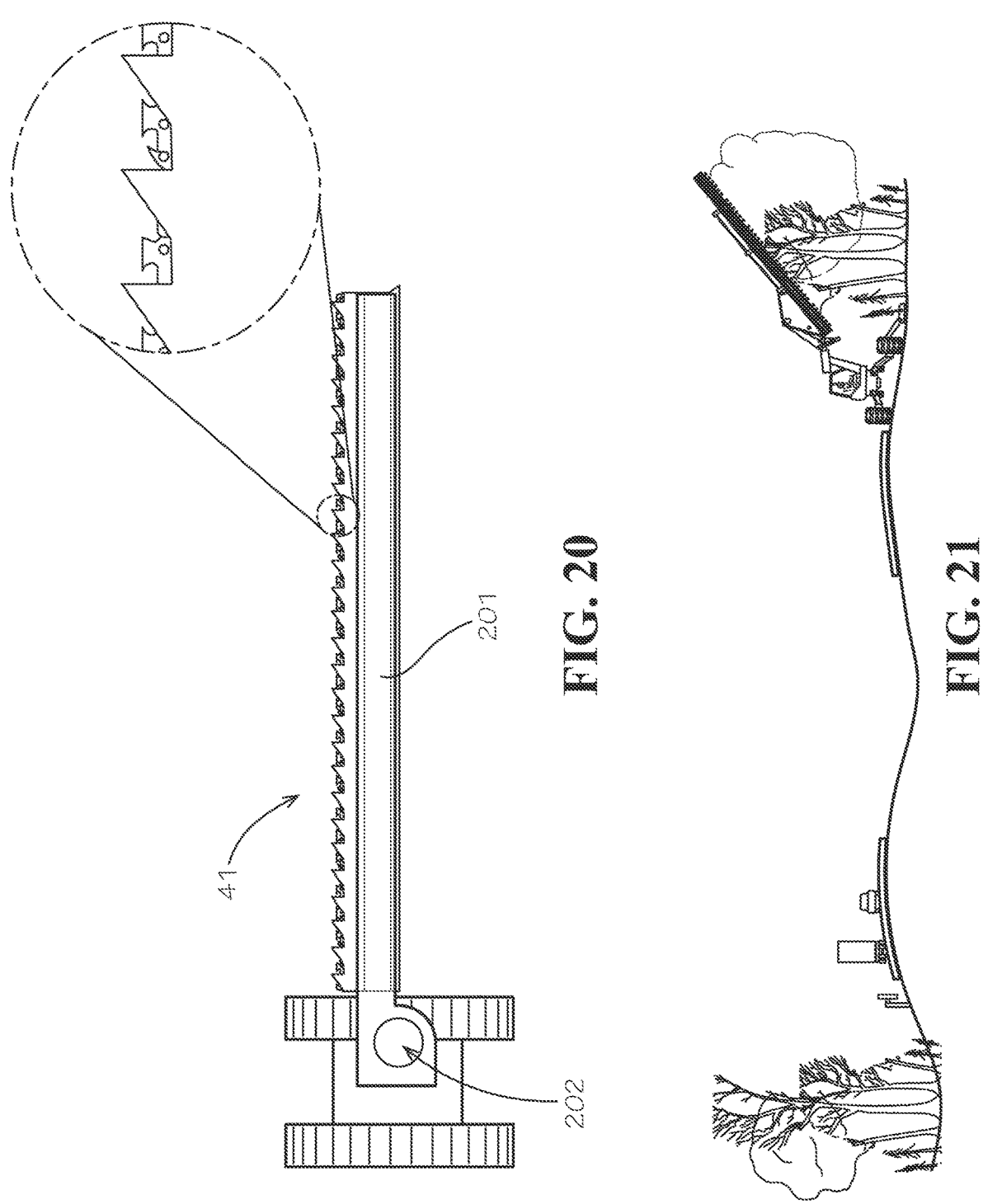
FIG. 20 illustrates an alternate embodiment of the cutting mechanism incorporating with a conveyor mechanism.
FIG. 21 illustrates use of the linear cutting mechanism in a roadway easement.

FIG. 17 shows the profile view of an easement in which the vertical system embodiments may be employed. The first step is to manually remove every limb greater than the nominal cutting width to either well below or beyond the initial cut plane 141, as illustrated by the dotted line. FIG. 18 illustrates the regrowth of small twigs and branches 151 beyond the initial cut plane 141 over the 2-3 years of the pruning cycle. FIG. 19 shows the vertical cutting system using the lattice boom embodiment described above working to trim the cut plane in an accelerated manner. While the first step certainly involves higher up-front costs, the benefits over time could prove substantial in terms of improved forest profile (and reduced power outages) and also in terms of ongoing pruning costs. FIG. 20 illustrates another embodiment of the cutting apparatus 41 which incorporates a conveyor boom 201 which facilitates removal of cut material and collection in a hopper 202.

The embodiments described above may be used in large-scale commercial maintenance of public and utility easements in which wooded growth exists, particularly wooded growth near power lines and near roads. In these applications, it is necessary to establish one or more initial cut planes. The initial cut plane 141 (as illustrated in FIG. 17) for public and utility easements is generally set by a utility or a government authority, which prescribe the predefined distance (i.e., setback) relative to a roadway or conductors within which tree limbs cannot encroach. Where appropriate (e.g., along easements having long straightaways), an initial cut plane could be established using computer software that processes data from measuring equipment incorporating data from laser measuring equipment and Global Positioning System (GPS)-based surveying apparatus to create a three-dimensional, georeferenced initial cut plane. Once the initial cut plane has been established, the data defining the initial cut plane can be sent to a computer coupled to a GPS navigation system located in one of the vehicle embodiments described above. The vehicle can then be positioned so that the boom-mounted cutting mechanism embodiments described above can be aligned with the initial cut plane. The vehicle moves along the initial cut plane in accordance with instructions from a navigation subsystem that processes data defining the initial cut plane and also GPS position data, with the articulated boom being coupled to the navigation software which provides instructions which allow the boom and the attached cutting apparatus/cutting head to be precisely positioned as illustrated in FIGS. 19 and 21. Once the initial cut plane is thus established, the easement is periodically surveyed for regrowth across the initial cut plane as shown in FIG. 18. Criteria for when the initial cut plane must be reestablished may depend upon a variety of factors, such as (i) limbs (of whatever diameter) growing within a predefined distance of a conductor, or (ii) limbs observed to be larger than a predefined diameter beyond the initial cut plane.

As described above, there are a handful of ways that the embodiments described could be employed for efficiently trimming trees. Specialized levelling equipment may also be used to help operators cut foliage exactly in the same place as was performed previously. Since cutting will no longer be subject to the movements of individual operators, the use of electromagnetic detection equipment could offer a degree of safety to operators in a way that is currently difficult to achieve. Observation equipment such as cameras and lasers could be installed at various points on the machinery to assist to fine-tune the cutting path.

The various potential embodiments described above are typically mounted on a vehicle, such as a truck, excavator, all-terrain vehicle (e.g., Manzi-Muck vehicle with multiple, independently articulable axles), skid steer, etc. The embodiments cannot easily be made into an attachment in the traditional sense of an "easily detachable" apparatus that expands the range of a base piece of equipment. However, to the extent that an appropriate existing vehicle can be modified to accommodate it, a device incorporating the above embodiments will have reduced cost. Because of the need to adjust the cutting path repeatedly, it is envisioned that the lower boom will slew with respect to the vehicle. Therefore, a vehicle which already has a slewing mechanism adapted to the approximate load-moment of the cutting head would be optimal.

The embodiments require an insulated segment in compliance with power (distribution) standards for operation in or close to minimum approach distance (MAD), which is the minimum distance from high voltage energized electrical conductors that is allowed by regulation. This segment is most likely to be close to the vehicle arm. One proposed vehicle is an excavator with a weight class of approximately 20,000 pounds and an extendable boom. The modification would be as follows:

1. Remove the receptacle, dog-bone, and extendable section.
2. Replace the extendable section with an insulated section that remains adequately insulated when fully retracted. (Longer than original boom by 2 feet)
3. This new fiberglass boom will also feature gussets, pins, and hydraulic cylinder needed to luff the nested multi-section extendable boom holding the cutter head.
4. Adapt the interior of the steel jib section with wear pads capable of allowing the fiberglass boom to slide within in without undue wear.
5. Replace the hydraulic hoses to the extendable nested multi-section boom with insulated hoses.
6. Modify the seat to allow for reclining and ergonomic visibility of the cutting head.
7. Modify hydraulic flow and pressure and/or cutter head requirements and modify controls to permit proper operation of the unit using vehicle hydraulics and controls.
8. Install a nested extendable boom on the end of the fiberglass section with at least one degree of freedom there to move in the plane of the boom.
9. Install the described cutter head at the end of the nested boom.
10. Install hydraulics, controls, and sensors.
11. Perform various weight studies and limit operation of the unit into any boom configuration with excessive load-moment.

A similar modification could be used for a Menzi-Muck or similar vehicle, if line clearance automation needed to be carried out on more demanding terrain. As mentioned previously, "Manzi-Muck" is a walking excavator vehicle featuring independent, telescoping, articulated axles that are manufactured by Manzi Muck AG based in Rüthi, Switzerland. A truck or similar vehicle could also be modified, but would require more work to modify, since hydraulic power would need to be engineered and installed to a power take-off, rather than adapted from an existing system. A slewing mechanism would need to be installed, and perhaps longer boom lengths would be necessary. Further, an outrigger system would need to be included.

Reference to vehicle above does not distinguish between a vehicle operated by a person, or an entirely autonomous vehicle, or a semi-autonomous vehicle where its activity is monitored by a human operator.

Figure 22:
FIG. 22 illustrates an alternate embodiment of the cutting mechanism integrated into linear boom configuration mounted to a tracked vehicle for maintenance pruning.

The pruning operation illustrated in FIG. 22 is a vertical system integrated to vehicle 10 adapted for translational movement parallel to energized conductors. The long cutting head 150 is held into position and anvils 411 mounted on one side for a single direction of vehicle travel. The anvils 411 may be either bar-mounted or mounted proximate to the cutting means. The degrees of freedom at the end of the boom are provided by slew drive 11 and lower boom 21 and allow the operator to maintain a consistent cut boundary as the vehicle encounters variations in terrain. This machine setup would be able to accomplish pruning along a given plane rapidly, but with less ability to accommodate protrusions or irregularities within the pruning plane.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A limb cutting apparatus, comprising:
   a cutting head, comprising:
      a front wall comprising:
         a motor-driven linear cutting means disposed in an upper edge of the front wall; and
         a first set of anvils and cutting channels disposed in the upper edge of the front wall adjacent to the motor-driven linear cutting means;
      a rear wall; and
   a receptacle defined by the front wall and opposing sidewalls.

2. The limb cutting apparatus according to claim 1, wherein the motor-driven linear cutting means is a motor-driven chain constrained to translate about a perimeter of a cutter bar.

3. The limb cutting apparatus according to claim 1, wherein the motor-driven linear cutting means is a plurality of motor-driven circular cutting blades disposed in the upper edge of the front wall.

4. The limb cutting apparatus according to claim 1, further comprising an articulated boom coupled to the cutting head, wherein the articulated boom comprises one or more telescoping jib sections, wherein a first end of the articulated boom is coupled to a vehicle.

5. The limb cutting apparatus according to claim 1, wherein the receptacle additionally comprises a rear wall.

6. The limb cutting apparatus according to claim 5 wherein the rear wall is disposed substantially parallel to the front wall in a first configuration, the rear wall comprising a rear wall upper edge and a rear wall lower edge, wherein the rear wall upper edge is adapted to translate linearly relative to the rear wall lower edge, and wherein the rear wall is hinged at the rear wall lower edge.

7. The limb cutting apparatus according to claim 1, further comprising an anti-pinching bar disposed parallel to and proximate to the cutter bar.

8. The limb cutting apparatus according to claim 1, further comprising a chipping drum disposed in the receptacle.

9. The limb cutting apparatus according to claim 1, wherein the cutting apparatus further comprises a pivot disposed in a first end of the cutter bar, wherein the pivot joins the cutter bar to the cutting head such that the cutter bar has one degree of rotational freedom relative to the cutting head.

10. The limb cutting apparatus according to claim 1, further comprising a second set of anvils, wherein the first set of anvils is adjacent to the substantially flat front face of the cutter bar and the second set of anvils is adjacent to the substantially flat rear face of the cutter bar.

11. The limb cutting apparatus according to claim 5, wherein the receptacle rear wall is articulated relative to the front wall.

* * * * *